Aug. 7, 1945.   C. A. HUTH   2,381,454
MACHINE FOR FILLING PRODUCTS INTO CONTAINERS
Filed March 25, 1943    2 Sheets-Sheet 1

TO SOURCE
OF VACUUM

INVENTOR.
Carl A. Huth
BY Ivan D. Thornburgh
Charles H. Erne
ATTORNEYS

Aug. 7, 1945.    C. A. HUTH    2,381,454
MACHINE FOR FILLING PRODUCTS INTO CONTAINERS
Filed March 25, 1943    2 Sheets-Sheet 2

INVENTOR.
Carl A. Huth
BY Ivan D. Thornburgh
Charles H. Erne
ATTORNEYS

Patented Aug. 7, 1945

2,381,454

UNITED STATES PATENT OFFICE 2,381,454

MACHINE FOR FILLING PRODUCTS INTO CONTAINERS

Carl A. Huth, Rutherford, N. J., assignor to American Can Company, New York, N. Y., a corporation of New Jersey Application March 25, 1943, Serial No. 480,512

1 Claim. (Cl. 226—116)

The present invention relates to a machine for filling lightweight flaky or granular products into containers and has particular reference to drawing the product particles into the containers simultaneously with the feeding of the product into them to effect a settling and a close packing of the product particles so that a predetermined quantity of the product may be uniformly placed into the containers.

In filling some kinds of lightweight powders and the like into containers, considerable difficulty has been experienced in the past in packing a predetermined weight of the product into a container of a desired size when the product particles are of such a flaky nature as to retard or prevent close packing or settling of the particles.

The instant invention was conceived to overcome this difficulty by drawing a vacuum at one end of the container while filling the product into the opposite end, and tests have successfully demonstrated that such a vacuum properly applied draws the product particles down into the container and results in the desired settling or close packing of a predetermined quantity of the product uniformly into the container.

An object therefore of the invention is the provision of a filling machine whereby the product particles are drawn into the container simultaneously with the filling of the product therein to effect a settling and a close packing of the product particles so that a predetermined quantity of the product may be uniformly placed into the container.

Another object is the provision of such a machine whereby the settling of the product particles within the container is effected by drawing a vacuum on the container adjacent one end while the product is being filled into the container adjacent the opposite end so that the product particles will be drawn into a closely packed mass within the container.

Still another object is the provision of a machine of this character in combination with a cooperatively constructed container for filling the product into a container having a dispensing opening and a filter gasket adjacent the opening wherein the vacuum is drawn from outside the container and through the dispensing opening and through the filter gasket so that the product particles will be drawn into closely packed position within the container while preventing escape of the product particles through said dispensing opening.

A further object is the provision of a novel machine for filling lightweight flaky or granular materials into containers whereby the product particles are drawn into the container simultaneously with the filling of the product into the container to effect a settling and a close packing of the product particles so that a predetermined quantity of the product may be uniformly placed into the container without any waste of the product during the filling operation.

Numerous other objects and advantages of the invention will be apparent as it is better understood from the following description, which, taken in connection with the accompanying drawings, discloses a preferred embodiment thereof.

Referring to the drawings.

Figure 1:
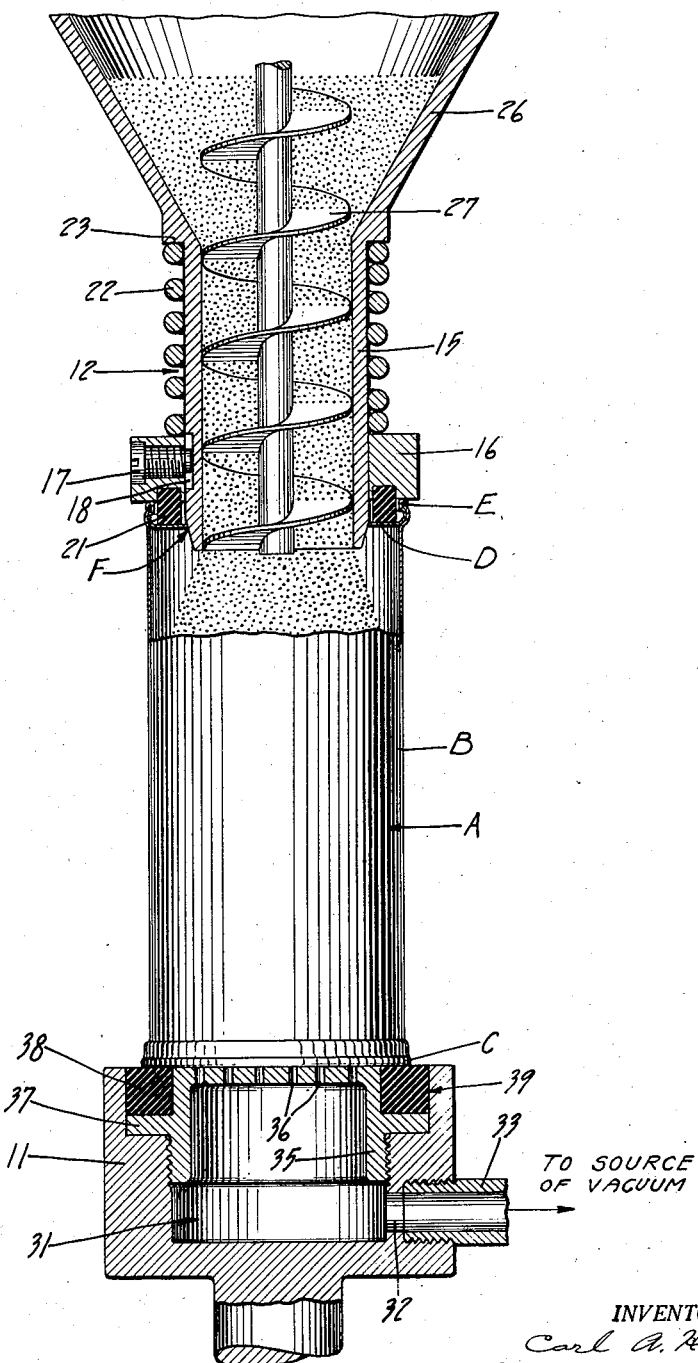
Figure 1 is a vertical sectional view of the principal parts of a filling machine embodying the instant invention and for carrying out the method steps of the invention, the view showing a container in place and being filled, with parts of the machine and a portion of the container broken away.

As a preferred embodiment of the invention the drawings disclose the essential parts of a preferred form of filling machine for filling a predetermined quantity of lightweight flaky or granular products such as talcum powder or the like into dispenser or sifter containers A (Fig. 1). The container to be filled is made preferably with a fibre sheet material body B which is fitted with a fibre sheet material top and bottom C and D respectively, secured in place by suitable end seams E. The dispenser container A is shown in inverted position in Figs. 1 and 3, which is its preferred filling position.

The bottom D of the container is formed with a filling opening F. The top of the container is formed preferably with a sifter type dispensing device (Figs. 2 and 3) although other discharge openings may be equally well adapted for use with the instant invention.

A preferred type of dispensing device includes a countersunk panel G which has a raised boss I having a plurality of sifter perforations or dispensing openings H, preferably grouped in a circle.

Figure 2:
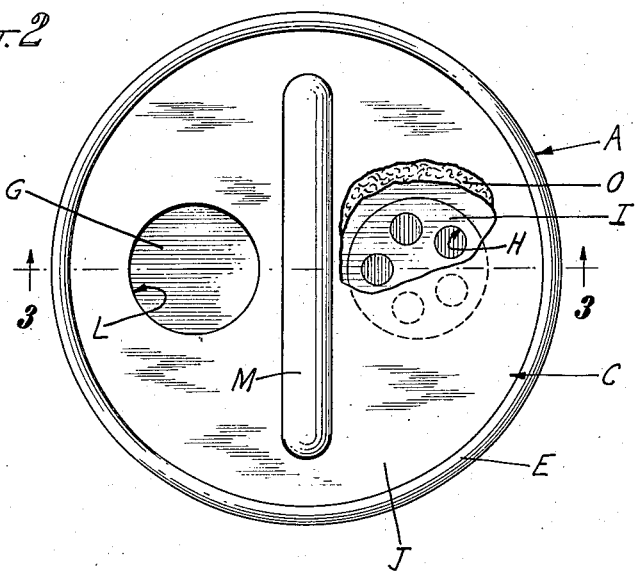
Fig. 2 is an enlarged top plan view of the sifter top of a filled container showing its dispensing openings in closed position, with portions broken away.
Figure 3:
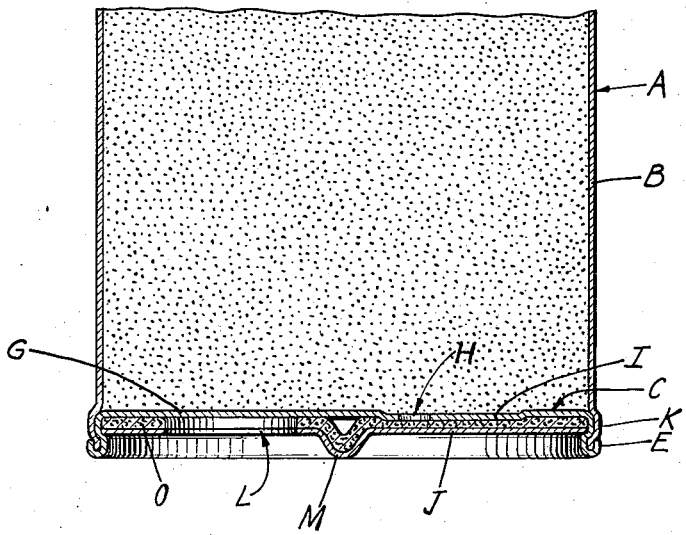
Fig. 3 is a vertical sectional view of the top portion of the sifter top container of Fig. 2, as viewed substantially along the line 3—3 in Fig. 2, but in inverted position.

The dispensing device further includes a rotatable disc J which is superimposed upon the can top C and which is held in rotatable position by an annular outwardly projecting bead K formed in the can top and in the adjacent body side wall which form an inner channel, into which the periphery or edge portion of the disc fits. The disc is formed with a single dispensing hole or opening L which is preferably of circular shape and of the same diameter as the circle of the grouped sifter openings H, and is provided with a raised elongated bead M which serves as a finger hold for rotating the disc to bring the dispensing hole L of the disc J into and out of dispensing registry with the grouped sifter perforations H. A resilient filter gasket O, preferably of felt, is interposed between the panel G and the disc J to prevent seepage of the contents when the sifter perforations are closed off. The gasket is secured to and rotates with the disc. The felt gasket O prevents leakage of the powdery or granular material when the disc is in closed position as shown in Figs. 2 and 3, but is porous enough to permit escape or withdrawal of air.

Filling of the container A with its product is effected preferably from the bottom of the container through the filling opening F. This filling operation is preferably performed while the container is in inverted position as shown in Figs. 1 and 3, the bottom end being uppermost while the container rests on its top end.

In accordance with the invention, the flaky product is fed into the container while the latter is in this inverted position. Simultaneously with this feeding of the product into one end of the container a vacuum is drawn at the opposite end. Preferably, the vacuum is drawn from outside the container and through the filter gasket O and through the dispensing openings H and L while the disc J is in closed position. This vacuum draws the product particles, as they are fed into the container, down into the container interior and effects a settling and close packing of the product particles into a compact mass so that a predetermined measured quantity of the product may be uniformly placed into a container of a predetermined and uniform size.

In the filling machine a container A to be filled rests in its inverted position on a support plate 11. This plate may be a lifter plate which is vertically movable to shift the can into and out of filling position. Filling of the product into the container may be accomplished by mere gravity but preferably by a filling head 12 which is located directly above the support plate 11 and in vertical alignment therewith. By means of the lifter plate 11 the filling end of the inverted container is raised into engagement with the filling head 12 as clearly shown in Fig. 1.

The filling head 12 includes a straight tubular portion or nozzle 15 which fits into the filling opening F of the container A when the latter is brought into filling position. The lower end of the nozzle carries a pressure collar 16 which is slidably adjustable on the nozzle by a setscrew 17, which engages in a groove 18 formed in the nozzle.

The pressure collar 16 carries an annular resilient sealing ring 21 which surrounds the nozzle and may be made of rubber or like material. This sealing ring engages against the filling end of the container and seals off the interior of the can from the outside atmosphere. The sealing ring is yieldably held against the container by its own resiliency and by a compression spring 22 which surrounds the nozzle and which is interposed between the pressure collar 16 and a shoulder 23 formed on the nozzle.

The upper end of the filling nozzle 15 widens integrally into a conical shaped hopper or reservoir 26 which contains a supply of the flaky or granular product to be filled into the can. The product may be force fed from the hopper into and through the nozzle and into the container by a vertical screw or auger 27 which is disposed within the nozzle. The lower end of the auger terminates adjacent the bottom of the nozzle. This auger extends up through the hopper and at its upper end may be rotated in any suitable manner.

The vacuum for sucking the product particles down into a compact mass within the can as they enter by way of the filling opening F in the filling end of the container, is drawn preferably through the support plate 11. For this purpose the support plate is formed with an enlarged passageway or vacuum chamber 31 which is in communication with a port 32 disposed adjacent the inner end of a conduit or tube 33 threaded into the plate. The tube 33 leads to any suitable source of vacuum.

The upper end of the vacuum chamber 31 is enclosed by an inverted cup shaped grid cap 35 which is threaded into the support plate 11. The flat top of the cap is formed with a plurality of perforations or small apertures 36 which are or may be grouped in a circle adjacent the end of the can when the latter is in filling position on the support plate. The cap is formed with a flange 37 which provides a seat for a resilient annular sealing ring 38 which surrounds the cap. This ring is made preferably of rubber and seals off the interior of a container from the outside atmosphere when the container is in filling position on the plate.

In some cases, it has been found that the sealing rings 21, 38 may be omitted if a sufficiently tight fit between the container ends and the filling device can be obtained so that sufficient vacuum can be drawn without the seals. In order to facilitate placing of a can on the plate 11, the sealing ring 38 is disposed in a recess 39 formed in the plate so that the tops of the plate, the ring, and the perforated cap 35 will be flush. The compression spring 22 in the filling head 12 holds the can tightly against the support plate 11 and between the sealing rings 21, 38.

Hence when an inverted container A, having its dispensing openings in closed position, as shown in Fig. 3 is placed on the support plate 11 and held in filling position against the filling head 12 by the spring 22, a vacuum drawn on the vacuum chamber 31 in the plate is effective up through the cap perforations 36, and draws a vacuum on the interior of the container through its dispensing openings H and L and through its filter gasket O. It is this vacuum that draws the product particles down into a settled and closely packed mass within the can as they are fed into it by the auger 27. This vacuum, being drawn through the filter gasket O, prevents the product particles from being drawn out of the can during the filling operation and thereby prevents wasting of the product.

While the container A has been described as being made entirely of fibre it is to be understood that the invention is applicable to a similarly constructed all metal container or to a container made partly of fibre and partly of metal.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

In a machine for filling a light weight flaky, granular or finely comminuted product into a container having a filling opening in one end and a dispensing opening in an opposite end, the combination of a filling head for feeding the product into the container through its filling opening, said head having a discharge nozzle extending into the container filling opening when the container is in filling position and having a surrounding sealing ring engaging one end wall of the container exteriorly of said opening in an air-tight seal, said head also having rotatable means inside of said nozzle for progressively forcing the product through said nozzle and into the container, a plate located below said filling head adjacent the opposite container end, said plate having a passageway formed therein, a sealing ring supported by said plate and surrounding said passageway, said ring engaging said opposite end of the container and cooperating with said plate to hold the container in clamped position against said head sealing ring in an air-tight seal, said passageway being communicable with the dispensing opening in the container, and means connecting with said passageway for drawing a vacuum through said dispensing opening on the interior of the container simultaneously with the forced feeding of the product therein to draw the inserted product particles into a compact mass within the container so that a predetermined quantity of the product may be uniformly placed into the container.

CARL A. HUTH.